United States Patent
Troop

(10) Patent No.: US 9,656,449 B2
(45) Date of Patent: May 23, 2017

(54) CONSOLIDATION DEVICE AND METHOD OF USING THE SAME

(71) Applicant: ROLLS-ROYCE PLC, London (GB)

(72) Inventor: Steven Paul Troop, Rotherham (GB)

(73) Assignee: ROLLS-ROYCE PLC, London (GB)

( * ) Notice: Subject to any disclaimer, the term of this patent is extended or adjusted under 35 U.S.C. 154(b) by 305 days.

(21) Appl. No.: 13/747,785

(22) Filed: Jan. 23, 2013

(65) Prior Publication Data
US 2013/0199721 A1    Aug. 8, 2013

(30) Foreign Application Priority Data
Feb. 6, 2012    (GB) .................................. 1201964.2

(51) Int. Cl.
*B32B 37/10*    (2006.01)
*B29C 70/38*    (2006.01)

(52) U.S. Cl.
CPC .......... *B32B 37/1009* (2013.01); *B29C 70/38* (2013.01); *Y10T 156/17* (2015.01)

(58) Field of Classification Search
CPC . B29C 65/7847; B29C 70/38; B32B 38/1858; B32B 37/1009; B29L 2031/3076
USPC ........................................ 156/285, 538, 499
See application file for complete search history.

(56) References Cited

U.S. PATENT DOCUMENTS 3,825,441 A * 7/1974 Achermann ........... D21H 23/68
156/210
2009/0130450 A1    5/2009 Anderson et al.

FOREIGN PATENT DOCUMENTS

| DE | 321590 C | 6/1920 |
| DE | 32 15 930 C1 | 5/1983 |
| DE | 32 26 290 A1 | 1/1984 |
| EP | 0 644 040 A1 | 3/1995 |
| EP | 0 712 721 A1 | 5/1996 |
| EP | 2 345 530 A1 | 7/2011 |

OTHER PUBLICATIONS

Jun. 6, 2012 Search Report issued in British Patent Application No. GB1201964.2.
Apr. 5, 2013 European Search Report issued in European Patent Application No. EP 13 15 2336.

* cited by examiner

*Primary Examiner* — Michael N Orlando
*Assistant Examiner* — Margaret Brodie
(74) *Attorney, Agent, or Firm* — Oliff PLC

(57) ABSTRACT

A consolidation device has a dispensing assembly configured to dispense a composite precursor material onto a surface of a mould, and a first nozzle assembly configured to direct a fluid stream onto the free surface of the dispensed composite precursor material. The use of a fluid flow to consolidate the dispensed composite precursor material onto the surface of the mould makes the device simpler, more cost effective and causes less damage to the surface of the composite article.

3 Claims, 4 Drawing Sheets

CONSOLIDATION DEVICE AND METHOD OF USING THE SAME

This invention claims the benefit of UK Patent Application No. 1201964.2, filed on 6 Feb. 2012, which is hereby incorporated herein in its entirety.

FIELD OF THE INVENTION

The present invention relates to composite processing technology and particularly, but not exclusively, to a compaction device for compacting composite tows, together with a method for using the device.

BACKGROUND TO THE INVENTION

Laminated composite materials, in which reinforcing fibres are held within a polymeric matrix, are extensively used in many engineering applications. Such materials can generally provide a higher strength and stiffness per unit weight than conventional metallic materials. This makes such composite materials advantageous for weight sensitive applications, such as those in the field of aerospace.

Conventional methods for manufacturing components from composite materials typically require extensive tooling fixtures and labour-intensive assembly procedures.

It is well known to automate the placement of composite fibres and/or tows for rapid, cost effective, net shape composite part manufacture. Such automated fibre placement methods can efficiently and reliably produce composite components using rotationally symmetrical, and/or contoured surface moulds.

A typical automated fibre tow placement machine comprises a tow dispensing head which moves across the surface of the mould and which is followed by a mechanical consolidation device such as a wheel or roller. In this context, the term consolidation is used to refer to the process of pressing the tows together to form a shaped article having a low level of internal voids. The shaped article may then be cured to form the finished component.

However, a known problem with such automated tow placement techniques is encountered when the surface geometry of the mould includes complex curvatures. In such moulds it can be difficult to ensure that the consolidation device follows the contours of the mould when consolidating the applied tows.

This can lead to the tows not being properly consolidated against the mould surface with the result that voids are generated within the shaped article. In extreme cases it may lead to the tows not following the surface of the mould, for example by 'bridging' recesses in the mould, which results in an incorrectly shaped article which must then be scrapped.

STATEMENTS OF INVENTION

According to a first aspect of the present invention there is provided a consolidation device comprising:
  a dispensing assembly configured to dispense a composite precursor material onto a surface of a mould; and
  a first nozzle assembly configured to direct a fluid stream onto the free surface of the dispensed composite precursor material, to thereby consolidate the dispensed composite precursor material onto the surface of the mould.

In the following description, the terms forward and rearward are to be understood as being relative to the direction of travel of the dispensing assembly 110.

By using a nozzle to direct a flow of fluid onto the surface of the dispensed composite material, the material can be consolidated onto the surface of the mould without the use of a roller or other mechanical consolidating device.

This eliminates the problem of the consolidation device becoming adhered to the composite material which can cause degradation of the surface finish and may make the consolidation less effective.

In addition, the use of a fluid flow consolidation technique makes it possible to consolidate the composite material over the entirety of a mould surface having multiple complex curved contours. This enables the consolidation device to apply an even compaction pressure to the precursor material even in highly contoured areas, which can be difficult to achieve using mechanical consolidation devices.

Conventional roller type consolidation devices are known to introduce friction and shear forces into the fibres or tows as they are dispensed onto the surface of the mould. This may introduce undesirable stresses into the shaped composite article. A further advantage of a fluid flow consolidation technique is that it eliminates the possibility of these friction and shear forces occurring.

In one embodiment, the first nozzle assembly is arranged to focus the fluid stream into a smaller contact area than can be achieved using a conventional roller type consolidation device. This enables the compaction pressure to be readily varied by adjusting the volumetric flow rate of the fluid stream.

In one embodiment of the present invention, the fluid is compressed air which is conveniently available in most industrial environments. In other embodiments, the fluid could take the form of another gas, or a liquid, depending upon the operating environment and/or the material which is to be consolidated.

Optionally, the first nozzle assembly comprising a heating element and the fluid stream passes over the heating element before exiting the first nozzle assembly to thereby increase the temperature of the fluid stream.

The consolidation of a shaped composite article may be combined with the application of heat to the article to cure the composite material.

This eliminates the need for an additional process step to heat the finished article to cure the composite material.

Conventional consolidation devices require, as a first step, heat energy to be imparted to the composite precursor material prior to a second step in which it is compacted by a roller assembly. In the present invention these two steps can be combined, which minimises the size and complexity of the consolidation device. In this way, the consolidation device of the present invention is simpler, cheaper to produce and easier to use than conventional consolidation devices.

The use of a heating element to transfer heat energy to the fluid stream prior to it leaving the nozzle enables the composite tow to be maintained at a temperature which allows the tow to be processed whilst also initiating the curing process.

Optionally, the temperature of the fluid stream exiting the first nozzle assembly is preferably between 40° C. and 150° C.

The choice of temperature for the fluid stream depends mainly on the type of composite material being processed.

For an epoxy resin composite material, a temperature of greater than approximately 85° C. is needed to ensure the material is sufficiently tacky to be consolidated in a multi-layer configuration.

For the same material, the curing process starts when the temperature of the material is greater than approximately 120° C. Consequently, exposure of the material to these temperatures should be minimised until the cure process is to be initiated.

For other composite materials, such as, for example, bismaleimide resins or other thermoplastic materials, the consolidation and cure temperatures may be higher than for epoxy type resins.

Optionally, a volumetric flow rate of the fluid stream exiting the first nozzle assembly may be varied in a pre-determined manner as the dispensing assembly dispenses the composite precursor material.

The volumetric flow rate of the fluid stream will be dependent upon the design and configuration of the nozzle, and also on the compaction load required to consolidate the particular composite material which is being dispensed onto the mould surface.

In one embodiment of the invention the aperture in the first nozzle assembly is formed as an elongate slot having a length which is slightly greater than the width of the composite tape which is being dispensed. This enables the nozzle to remain stationary relative to the dispensing head as the tape is dispensed.

In an alternative embodiment of the invention, the aperture in the first nozzle assembly is sized to be smaller than the width of the composite tape. In this arrangement, the first nozzle traverses laterally across the width of the composite tape as it is dispensed. By combining this lateral movement with pre-determined variation in the volumetric flow rate of the fluid, it is possible to vary the level of consolidation across the width of the composite tape.

In another embodiment of the invention, the volumetric flow rate of the fluid may be periodically varied, or 'pulsed', with the movement of dispensing assembly being timed such that the dispensed precursor material experiences a discontinuous stroking action. This could be achieved by the use of multiple nozzle outlets configured in a rotating arrangement. Alternatively, the first nozzle assembly could be pivoted normal to the direction of travel of the dispensing assembly, with the fluid flow being supplied only when the first nozzle assembly sweeps forward.

In a further embodiment of the invention, the first nozzle assembly comprises a plurality of apertures, or jets. This arrangement may be advantageous in applications where the mould surface has multiple compound curves.

This plurality of jets may be used to 'scan' the surface and 'stroke' the composite tape in a particular direction, or in several directions. This could provide waves of air pressure in the lay direction with periodic sideward movements to urge adjacent tapes to fill any gap therebetween.

Optionally, the composite precursor material is selected from the group comprising composite fibres, composite tows and composite tape.

Optionally, the consolidation device further comprises a compaction assembly having:
an actuator; and
a foot portion,
the foot portion being movable between a first retracted position and a second extended position, whereby in the first position the foot portion is spaced apart from the surface of the mould, and in the second position the foot portion presses against the dispensed composite precursor material.

In its extended position, the foot portion imparts a point load onto the composite precursor material, placing it in the desired position whilst the dispensing assembly remains stationary. The foot portion is then retracted to enable the composite precursor material to be dispensed and consolidated to form the shaped composite article.

In one embodiment of the invention, the foot portion comprises a single actuatable element movable between the first and second positions.

In other embodiments of the invention, the foot portion may comprise multiple actuatable elements, each of which is individually movable between the first and second positions. Such an arrangement enables the foot portion to conform to a curved mould surface.

Optionally, the actuator is selected from the group comprising pneumatic actuators, hydraulic actuators, mechanical actuators or electric actuators.

Optionally, the consolidation device further comprises a second nozzle assembly configured to create a partial vacuum in a region between the composite precursor material and the surface of the mould, as the composite precursor material is dispensed from the dispensing assembly.

By creating a partial vacuum in the region immediately ahead of the dispensed composite precursor material, the dispensed composite precursor material is drawn down onto the surface of the mould. This positions the precursor material immediately prior to the compaction force being applied.

This use of a partial vacuum to position the precursor material, as it is dispensed, minimises the quantity of air trapped beneath the consolidated precursor material. This makes the subsequent debulking process quicker and thereby improves the efficiency of the manufacturing process.

According to a second aspect of the present invention there is provided a method of using a consolidation device comprising a dispensing assembly and a first nozzle assembly, the method comprising the steps of:
(i) dispensing a composite precursor material from the dispensing assembly in a pre-determined arrangement onto a surface of a mould;
(ii) generating a stream of fluid having a pre-determined volumetric flow rate; and
(iii) controllably directing the stream of fluid from the first nozzle assembly onto the free surface of the dispensed composite precursor material to thereby consolidate the dispensed composite precursor material onto the surface of the mould.

In one embodiment of the invention, the composite precursor material comprises composite fibres. In other embodiments, the precursor material may take the form of, for example, composite tows, composite tape or composite sheet.

The composite precursor material may be dispensed automatically in a pre-determined manner, for example using conventional automated tape laying techniques.

Alternatively, the dispensing of the precursor material may be manually controlled, for example as a replacement for the use of hand roller tools.

Optionally, step (ii) comprises the additional step of:
(ii)(a) heating the stream of fluid to a pre-determined temperature.

Optionally, the composite precursor material is selected from the group comprising composite fibres, a composite tows and composite tape.

Optionally, the consolidation device further comprises a compaction device having an actuator and a foot portion, and step (i) comprises the additional step of:
(i)(a) controllably extending the foot portion from a first retracted position in which the foot portion is spaced apart from the surface of the mould, to a second extended position in which the foot portion presses against the dispensed composite precursor material.

Optionally, the consolidation device further comprises a second nozzle assembly, and step (i) comprises the additional initial step of:

(iv) using the second nozzle assembly to create a partial vacuum in the region between the composite precursor material and the mould surface as the composite precursor material is dispensed onto the surface of the mould.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

There now follows a description of an embodiment of the invention, by way of non-limiting example, with reference being made to the accompanying drawings in which.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 1:
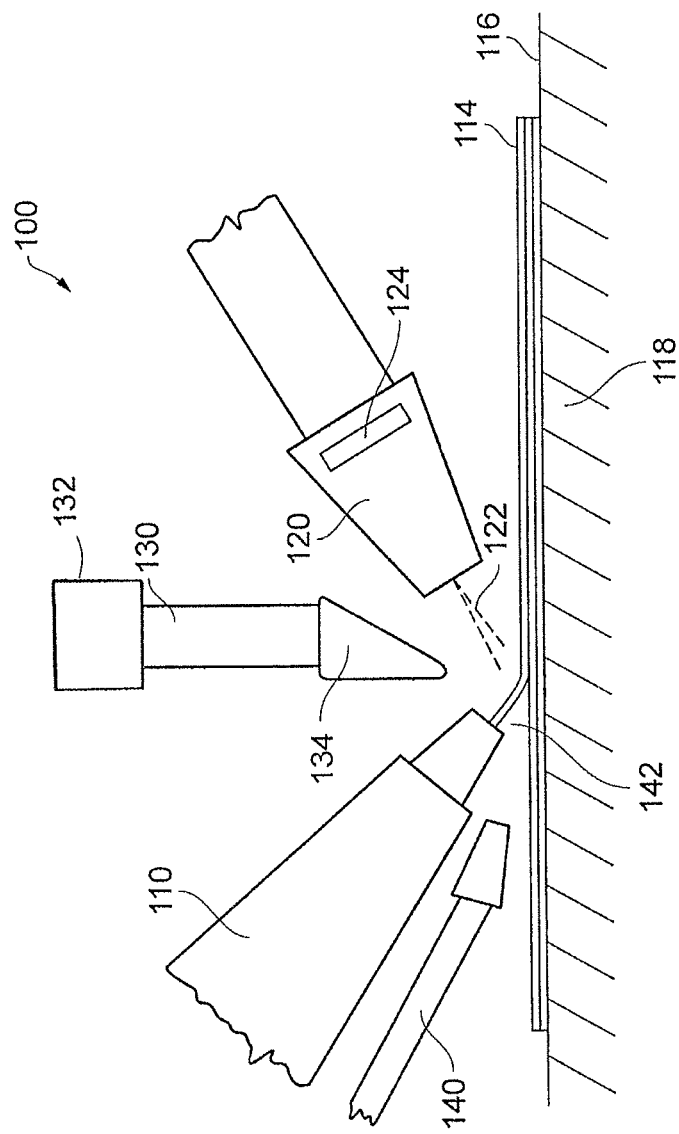
FIG. 1 shows a schematic partial side view of a consolidation device according to a first embodiment of the present invention.
Figure 2:
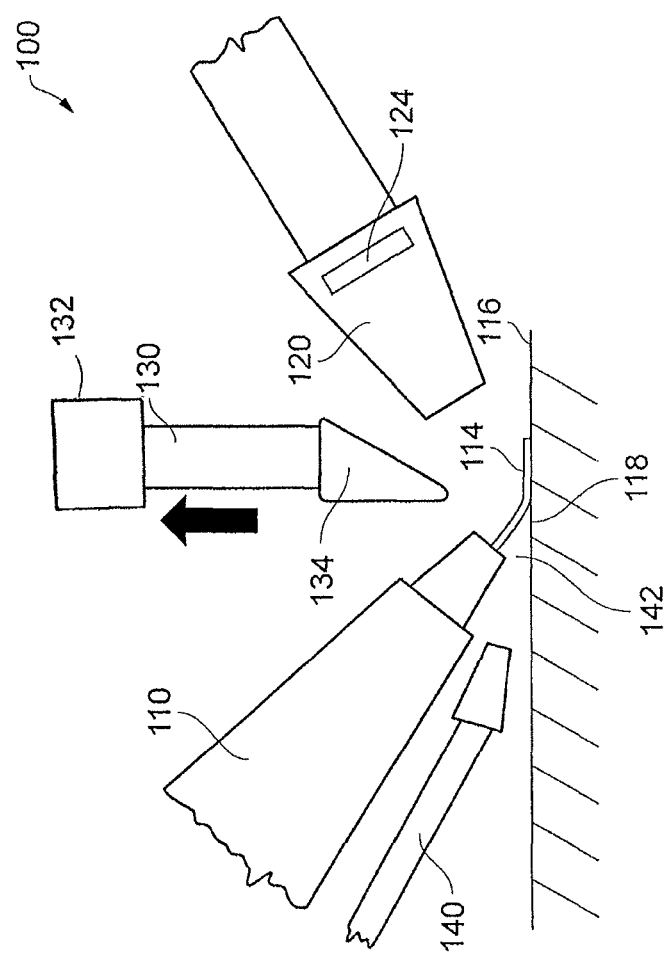
FIG. 2 shows the consolidation device of FIG. 1 with a foot portion in a first, retracted position.
Figure 3:
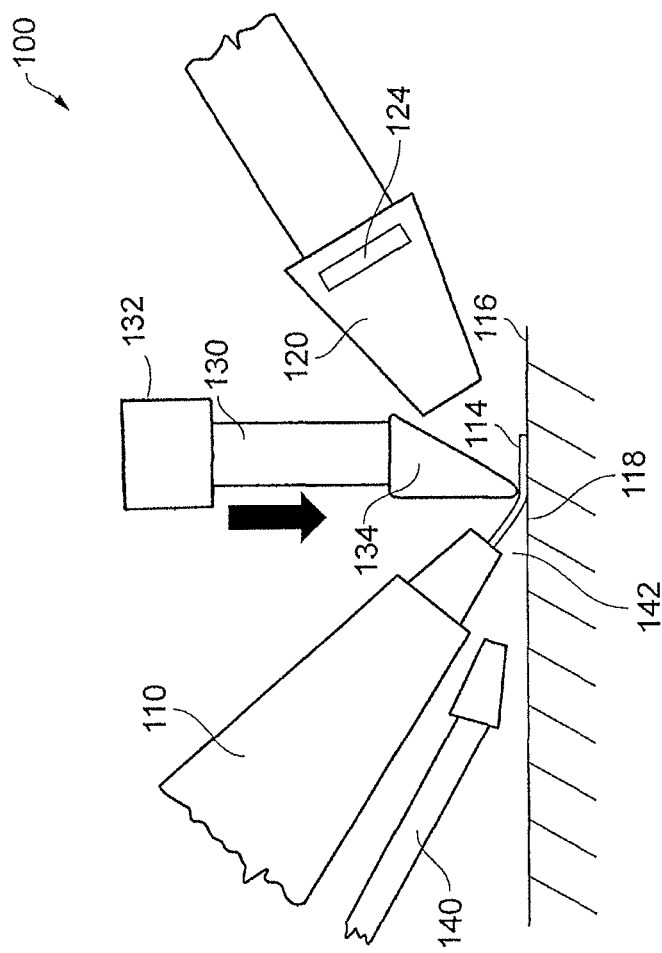
FIG. 3 shows the consolidation device of FIG. 1 with a foot portion in a second, extended position.

Referring to FIGS. 1 to 3, a consolidation device according to a first embodiment of the invention is designated generally by the reference numeral 100.

The consolidation device 100 comprises a dispensing assembly 110, a first nozzle assembly 120, a compaction assembly 130 and a second nozzle assembly 140.

The dispensing assembly 110 is configured to dispense a composite precursor material 114 onto a surface 116 of a mould 118. The composite precursor material 114 takes the form of a pre-preg composite tape 114.

In this embodiment, dispensing assembly 110 is part of a conventional automated composite tape-laying machine (not shown). The dispensing assembly 110 is oriented at an acute angle to its direction of travel over the surface 116.

The first nozzle assembly 120 is positioned rearward of the dispensing assembly 110 and is oriented so as to direct a fluid stream 122 onto the surface of the composite tape 114 as it is dispensed onto the surface 116. The gas stream 122 takes the form of compressed air flow 122.

A heating element 124 is positioned within the first nozzle assembly 120 and is configured to controllably increase the temperature of the gas stream 122. The volumetric flow rate of the gas stream 122 exiting the first nozzle assembly 120 may also be controllably varied. In one arrangement, this volumetric flow rate ranges between 0.2 m$^3$/sec and 0.7 m$^3$/sec.

The compaction assembly 130 comprises an actuator 132 and a foot portion 134, and is positioned between the dispensing assembly 110 and the first nozzle assembly 120.

As shown in FIGS. 2 and 3, the actuator 132 is configured to controllably move the foot portion 134 in a direction of travel substantially normal to the surface 116, between a first retracted position and a second extended position. In its first extended position, the foot portion 134 presses against the surface 116.

The second nozzle assembly 140 is positioned between the dispensing assembly 110 and the surface 116, and is connected to a vacuum source (not shown). The second nozzle assembly 140 creates a partial vacuum in the region 142 immediately forward of the composite tape 114 as it is dispensed onto the surface 116.

The first and second nozzle assemblies 120, 140 may be connected to an actuation system (not shown) to enable them to be independently positioned relative to the dispensing assembly 110. The operation of this actuation system may be controlled in a pre-programmed manner or through a feedback system which is capable of altering the position of either nozzle assembly 120, 140 as the tape 114 is being dispensed. This feature may enable the system to consolidate material in highly contoured regions of a mould surface 116 where there is limited clearance for the dispensing assembly 110. This feature may also provide 'steerage' to the composite tape 114 to, for instance, even up the gaps between the tapes 114 when crossing a contoured surface 118.

In use, an end of the composite tape 114 is positioned on the surface 116 of the mould 118. The dispensing assembly 110 remains stationary while the compaction assembly 130 is actuated. This actuation causes the foot portion 134 of the compaction assembly 130 to extend and press the end of the composite tape 114 securely against the surface 116.

At this point, the dispensing assembly 110 moves over the surface 116 over the mould 118 in a pre-determined path and dispenses the composite tape 114 onto the surface 116.

The second nozzle assembly 140 creates a partial vacuum forward of the composite tape 114 as it is dispensed onto the surface 116. This partial vacuum assists in the composite tape 114 adhering to the surface 116 by minimising the amount of air which becomes trapped beneath the composite tape 114.

The first nozzle assembly 120 directs a compressed air stream 122 onto an upper surface of the composite tape 114 as it is applied to the surface 116. The pressure of the compressed air stream 122 can be varied so as to provide a uniform compaction force over a contoured mould surface. The compressed air stream 122 forces any remaining trapped air from beneath the dispensed composite tape and consolidates the tape layers together.

When the dispensing assembly has dispensed the appropriate length of tape onto the surface 116 it automatically cuts the tape, repositions itself at the start of the next tape placement route and feeds an end of the tape in readiness for the compaction assembly to attach this to the surface 116.

Figure 4:
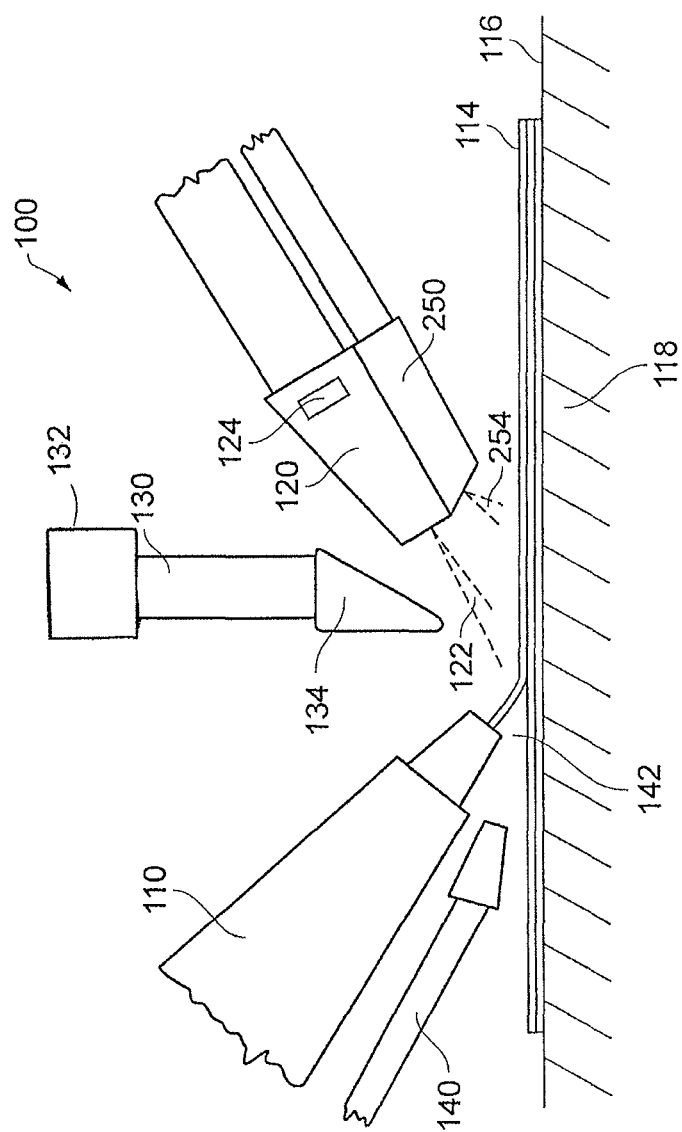
FIG. 4 shows a schematic partial side view of a consolidation device according to a second embodiment of the present invention.

Referring to FIG. 4, a consolidation device according to a second embodiment of the invention is designated generally by the reference numeral 200. Features of the consolidation device 200 which correspond to those of consolidation device 100 have been given corresponding reference numerals for ease of reference.

The consolidation device 200 has a dispensing assembly 110, a first nozzle assembly 120, a compaction assembly 130 and a second nozzle assembly 140.

In addition, the consolidation device 200 includes a third nozzle assembly 250 which is positioned between the first nozzle assembly 120 and the surface 116.

In use, the consolidation device 200 functions in the same way as described above for the consolidation device 100, with the following addition.

As the composite tape 114 is dispensed and consolidated onto the surface 116 of the mould 118, the third nozzle 250 directs a cold fluid stream 254 onto the surface 116 of the consolidated composite tape 114.

The present invention may be embodied in other specific forms without departing from its spirit or essential characteristics. The described embodiments are to be considered in all respects only as illustrative and not restrictive. The scope of the invention is therefore indicated by the appended claims rather than by the foregoing description. All changes which come within the meaning and range of equivalency of the claims are to be embraced within their scope.

What is claimed is:

1. A consolidation device comprising:
    a dispensing assembly configured to dispense a composite precursor material onto a surface of a mould;
    a first nozzle assembly configured to direct a fluid stream onto a free surface of the dispensed composite precursor material, to thereby consolidate the dispensed composite precursor material onto the surface of the mould;
    a second nozzle assembly configured to create a partial vacuum in a region between the composite precursor material and the surface of the mould, as the composite precursor material is dispensed from the dispensing assembly; and
    a third nozzle assembly positioned between the first nozzle assembly and the free surface of the dispensed precursor material, the third nozzle assembly configured to direct a cold fluid stream onto the free surface of the dispensed composite precursor material,
    the first nozzle assembly is further configured to controllably vary a volumetric flow rate of the fluid stream exiting the first nozzle assembly, the volumetric flow rate of the fluid stream ranging between a first flow rate and a second flow rate, so as to provide a uniform compaction force over the surface of the mould, as the dispensing assembly dispenses the composite precursor material.

2. A consolidation device as claimed in claim 1, wherein the first flow rate and the second flow rate of the fluid stream exiting the first nozzle assembly are greater than zero.

3. A consolidation device as claimed in claim 1, wherein the second nozzle assembly that is configured to create the partial vacuum is positioned between the dispensing assembly and the surface of the mould.

* * * * *